(12) United States Patent
Brorson et al.

(10) Patent No.: US 6,887,453 B2
(45) Date of Patent: May 3, 2005

(54) RHENIUM (IV) SULPHIDE NANOTUBE MATERIAL AND METHOD OF PREPARATION

(75) Inventors: Michael Brorson, Holte (DK); Claus J. H. Jacobsen, Jaegerspris (DK); Thomas Willum Hansen, Copenhagen N (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 10/639,518

(22) Filed: Aug. 13, 2003

(65) Prior Publication Data

US 2005/0036937 A1 Feb. 17, 2005

(30) Foreign Application Priority Data

Aug. 24, 2002 (DK) .......................................... 2002-01250

(51) Int. Cl.$^7$ ............................ C01G 47/00; B82B 3/00
(52) U.S. Cl. ............................... 423/561.1; 977/DIG. 1
(58) Field of Search ................... 423/561.1; 977/DIG. 1

(56) References Cited

U.S. PATENT DOCUMENTS

| 4,308,171 A | * | 12/1981 | Dines et al. ................. 502/167 |
| 5,958,358 A | * | 9/1999 | Tenne et al. ............. 423/561.1 |
| 6,146,227 A | | 11/2000 | Mancevski |
| 6,333,016 B1 | | 12/2001 | Resasco et al. |
| 2004/0062708 A1 | * | 4/2004 | Remskar et al. ......... 423/561.1 |
| 2004/0089410 A1 | * | 5/2004 | Tenne et al. ................. 156/230 |

FOREIGN PATENT DOCUMENTS

| DE | 10048406 | 6/2002 |
| WO | WO-95/10481 | 4/1995 |
| WO | WO-01/30690 | 10/2000 |
| WO | WO-00/66485 | 11/2000 |
| WO | WO-02/30814 | 10/2001 |

OTHER PUBLICATIONS

Chianelli et al., "Synthesis, Fundamental Properties and Applications of Nanocrystals, Sheets, Nanotubes and Cylinders Based On Layered Transition Metal Chalcogenides", Materials Technology, 2000, vol. 5, Issue 1, pp. 54–61.*
EP Search Report for EP 03 01 7936, with mailing date of Jul. 27, 2004.*
Chianelli, "Synthesis, Fundamental Properties and Applications of Nanocrystals, Sheets and Fullerenes Based On Layered Transition Metal Chalcogenides", available via http://www.wtec.org/loyola/nano/US.Review/07_02.htm, published Jan. 1998.*

Satishkumar et al., "Synthesis of metal oxide nanorods using carbon nanotubes as templates", Journal of Materials Chemistry, 2000, vol. 10, pp. 2115–2119, published on the web Jul. 19, 2000.*
Whitby et al., "Tungsten Disulphide Sheathed Carbon Nanotubes", ChemPhysChem, 2001, vol. 2, Issue 10, pp. 620–623, published online Oct. 8, 2001.*
Brorson et al., "Rhenium(IV) Sulfide Nanotubes", Journal of the American Chemical Society, 2002, vol. 124, Issue 39, pp. 11582–11583, published on Web Sep. 4, 2002.*
Coleman et al., "The Formation of ReS2 Inorganic Fullerene–like Structures Containing Re4 Parallelogram Units and Metal–Metal Bonds", Journal of the American Chemical Society, 2002, vol. 124, Issue 39, pp. 11580–11581, published on Web Sep. 11, 2002.*
Terrones et al., "Curved nanostructured materials", New Journal of Physics, 2003, vol. 5, pp. 126.1–126.37, published Oct. 3, 2003.*
R. Tenne, "Fullerene–Like Structures and Nanotubes from Inorganic Compounds", *Endeavour*, Pergamon Press, Oxford, Great Britain, vol. 20, No. 3, 1996, pp. 97–104.
R. Tenne et al., "Polyhedral and Cylindrical Structures of Tungsten Disulphide", *Nature*, vol. 6403, No. 360, Nov. 5, 1992, pp. 444–446.
Y. Zhu et al., "Carbon nanotube template promoted growth of NbS2 nanotubes/nanorods," *Chem. Commun.*, 2001, pp. 2184–2185.
R. Tenne, "Inorganic Nanoclusters with Fullerene–Like Stucture and Nanotubes," *Progress in Inorganic Chemistry*, 2001, vol. 50, pp. 269–315.
M. Spahr et al., "Redox–Active Nanotubes of Vanadium Oxide," *Angew Chem. Int. Ed.*, 1998, vol. 37, No. 9, pp. 1263–1265.

* cited by examiner

Primary Examiner—Stanley S. Silverman
Assistant Examiner—Ardith E. Hertzog
(74) Attorney, Agent, or Firm—Dickstein Shapiro Morin & Oshinsky LLP

(57) ABSTRACT

A rhenium (IV) sulphide (ReS$_2$) nanotube material and a method of preparation of the rhenium (IV) sulphide (ReS$_2$) nanotube material. The rhenium (IV) sulphide (ReS$_2$) nanotube material comprises hollow cylinders of concentric rhenium (IV) sulphide layers, the ReS$_2$ interlayer distance being between 0.5 to 0.7 nm. Each ReS$_2$ layer consists of a layer of rhenium atoms sandwiched between two layers of sulfur atoms.

8 Claims, 3 Drawing Sheets

RHENIUM (IV) SULPHIDE NANOTUBE MATERIAL AND METHOD OF PREPARATION

The present invention relates to the material rhenium (IV) sulphide in the polymorphic form of nanotubes and a method for preparation of this material.

BACKGROUND OF THE INVENTION

During the last years, new classes of materials termed nanotubes have attracted considerable attention. The most well known nanotubes are the so-called carbon nanotubes (Iijima, S. *Nature* 1991, 254, 56) that exist either as single-walled carbon nanotubes, SWCNT, or as multi-walled carbon nanotubes, MWCNT. Numerous preparative routes to these materials have been patented (e.g. Smalley, R. E., U.S. Pat. No. 5,591,312; Smalley, R. E. at al., WO 98/39250; Jang, J. and Chung, S.-J., EP 1 046 613 A2; Smalley, R. E. et al., WO 00/17102; Cheng, H. et al., EP 1 061 044 A1 and EP 1 061 041 A1; Resasco, D. E. et al., WO 00/73205 A1; Kambe, N. and Bi, X., U.S. Pat. No. 6,045,769).

Carbon nanotubes have been shown to posses a wide range of physical properties that suggest that these materials could find use in a variety of technological applications. Particularly, the possibility of using carbon nanotubes as the building blocks in nanotechnology has recently been a major driving force for detailed studies of such materials. Carbon nanotubes are composed of graphite layers rolled up as cylinders with a diameter determined by the number of carbon atoms in the perimeter of the tube as shown in FIG. 1. The tubes can have closed ends. If there is only one cylindrical tube, the carbon nanotube material is termed single-walled (SWCNT). If more concentric cylindrical tubes are present (with a distance between the individual tubes of approximately 0.35 nm) the tubes are termed multi-walled (MWCNT). By high-resolution transmission electron microscopy (HRTEM) it is easily determined if a given sample contains either SWCNT or MWCNT. Obviously, to construct, for instance, electronic devices with the properties required for use in nanotechnological applications, it is desirable to have access also to nanotubes with a different chemical composition than carbon and thus with different physical and chemical properties. Consequently, much work has focused on the preparation of nanotubes of other materials. However, so far only a few materials have been isolated in the form of nanotubes, e.g., BN (Chopra, N. G. et al., *Science* 1995, 269, 966), $B_xC_yN_z$ (Stephan, O. et al., *Science* 1994, 266, 1683), $WS_2$ (Tenne, R. et al., *Nature* 1992, 360, 444), $MoS_2$ (Feldman, Y. et al., *Science* 1995, 267, 222 and Remskar, M. et al., *Science* 2001, 292, 479), $NiCl_2$ (Hacohen, Y. R. et al., *Nature* 1998, 395, 336), $NbS_2$ (Nath, M. and Rao, C. N. R., *J. Am. Chem. Soc.* 2001, 123, 4841 and Zhu, Y. et al., *Chem. Commun.* 2001, 2184), and Bi (Li, Y. et al., *J. Am. Chem. Soc.* 2001, 123, 9904).

A review article by R. Tenne (*Progress in Inorganic Chemistry* 2001, 50, 269) gives an overview of the area. A vanadium oxide nanotube material, which contains α,ω-diamines intercalated between the metal oxide layers, has also been described (Spahr, M. E. et al., *Angew. Chem., Int. Ed. Engl.* 1998, 37, 1263. and Krumeich, F. et al., *J. Am. Chem. Soc.* 1999, 121, 8324) and patented (Nesper, R. et al., Wo 01/30690 A2).

WO 00/66485 describes the synthesis of long nanotubes of transition metal chalcogenides. The method is based on the synthesis of nanoparticles of a transition metal oxide. The oxide particles are annealed with for instance $H_2S$ to obtain nanotubes. This method was used to produce nanotubes of wolfram sulphide, $WS_2$. One limitation of this method is that not all transition metal oxides can be easily handled under the conditions stated in the method. That makes this method unsuitable for the preparation of for instance rhenium sulphide nanotube materials.

All the nanotube materials have layer structures in their ordinary polymophic modifications. $NbS_2$, $MOS_2$ and $WS_2$ have closely related structures. Each individual layer in these materials consists of a metal atom layer sandwiched between two layers of sulphur atoms. The transition metal atoms are trigonal prismatically coordinated with sulphur atoms. So far, there have been no reports of nanotubes containing elements from group 7 of the Periodic Table (i.e. Mn, Tc, and Re).

SUMMARY OF THE INVENTION

Rhenium (IV) sulphide, $ReS_2$, has a layer structure similar to that of other transition metal disulphides such as e.g. $NbS_2$, $MoS_2$ and $WS_2$. Each $ReS_2$ layer consists of a rhenium atom layer sandwiched between two sulphur atom layers. $ReS_2$ contains a metal ion with an electron configuration not seen in the presently known metal sulphide nanotubes. Niobium (IV) sulphide has a $d^1$ electron configuration, molybdenum (IV) sulphide and tungsten (IV) sulphide have a $d^2$ electron configuration, whereas rhenium (IV) sulphide has a $d^3$ electron configuration. At the same time, rhenium (IV) sulphide also has a different coordination of rhenium. Rhenium is octahedrally coordinated by sulphur in $ReS_2$ contrary to the trigonal prismatic coordination of Nb, Mo and W in their sulphides. The rhenium (IV) sulphide material can therefore provide nanotubes with both an unprecedented electron structure and a new crystallographic structure.

Furthermore, the crystal structure of $ReS_2$ shows that the rhenium atoms form tetranuclear clusters due to metal—metal bonding interactions (Murray, H. H.; Kelty, S. P.; Chianelli, R. R.; Day, C. S. *Inorg. Chem.* 1994, 33, 4418). This structural characteristic is unique for $ReS_2$.

It is therefore an object of the invention to provide a rhenium (IV) sulphide material in the form of nanotubes.

This object is achieved by providing a rhenium (IV) sulphide ($ReS_2$) nanotube material comprising hollow cylinders of concentric rhenium (IV) sulphide layers, the $ReS_2$ interlayer distance being 0.5–0.7 nm, each $ReS_2$ layer consisting of a layer of rhenium atoms sandwiched between two layers of sulphur atoms.

The rhenium (IV) sulphide nanotube material may have an inner nanotube diameter between 2 to 500 nm. The rhenium (IV) sulphide nanotube material may contain from 1–50 concentric layers.

A method for the preparation of the rhenium (IV) sulphide nanotube material is also provided. The method comprises the steps of:
(a) providing a nanotube template material
(b) impregnating the template material with a rhenium-containing solution
(c) drying the impregnated template material
(d) treating the dried material from step (c) with a sulphiding agent.

In the above method, the nanotube template material may have an inner or outer diameter between 2 to 500 nm.

DETAILED DESCRIPTION OF THE INVENTION

A wide range of different techniques has prepared Nanotubes of different materials. Particularly for carbon nanotubes and other carbon nanofilaments (carbon filaments with a diameter below 500 nm) several techniques are available that allow a detailed control of both the microstructure and the macrostructure of the nanotubes.

In the preparation of the rhenium (IV) sulphide nanotube material of the invention, carbon nanotubes were used as a templating material. Using this method, it was possible to rationally design rhenium (IV) sulphide nanotube material with respect to both nanotube diameter, which is determined by the diameter of the carbon nanotube starting materials and the number of $ReS_2$ layers determined by the amount of Re used relative to that of the carbon nanotube starting material. It was also possible to design the $ReS_2$ nanotubes with respect to their length, which is determined by the length of the carbon nanotubes.

Very long carbon nanotubes several centimeters in length are currently available and have been described by Zhu, H. W. et al. in Science 2002, 296, 884, but the method is not limited to using only these materials. Other nanotube materials not necessarily consisting of carbon could be used as templates. Such materials are further discussed by R. Tenne (Progress in Inorganic Chemistry 2001, 50, 269).

Many different applications for nanotube materials have been suggested and are being explored. The use as superstrong fibres and their use as components for electronics (Collins, P. G.; Avouris, P. Scientific American December 2000, 38) are examples. Templating materials used for synthesis of nanotubes may be removed if this is necessary for the application.

The following examples illustrate the preparation of a $ReS_2$ nanotube material of the invention.

EXAMPLE 1

Figure 1:
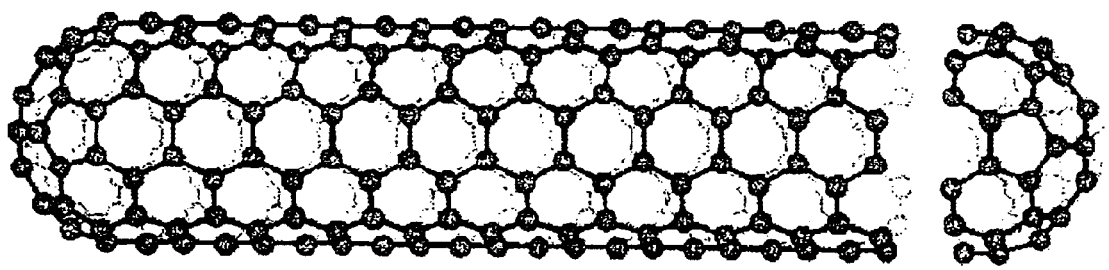
FIG. 1 shows a schematic drawing of a carbon nanotube and the positions of the carbon atoms.
Figure 2:
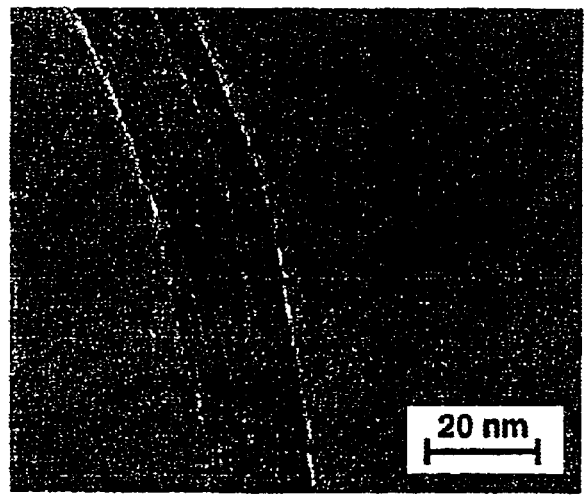
FIG. 2 shows a High Resolution Transmission Electron Microscopy (HRTEM) image of a multi-walled carbon nanotube.
Figure 3:
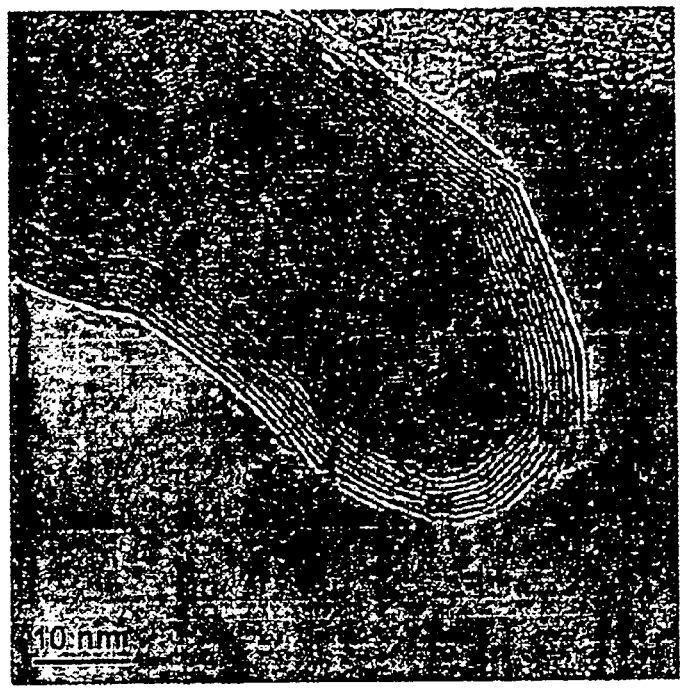
FIG. 3 shows a multi-walled carbon nanotube covered by 8–11 layers of rhenium (IV) sulphide.

Multi-walled carbon nanotube material (MWCNT) containing approximately 8–10 carbon layers was used as template for the preparation of the $ReS_2$ nanotube materials of the invention. This was verified by the HRTEM image shown in FIG. 2. The material had inner and outer diameters of 8–9 nm and 20 nm approximately. This material was impregnated with an aqueous solution of $NH_4ReO_4$ containing a molar amount of Re which was 25% of the molar amount of carbon in the MWCNT material. The sample was dried and then treated with hydrogen sulphide at 1000° C. for 3 hours. The HRTEM image shown in FIG. 3 revealed that a new nanotube material had grown on the surface of the carbon nanotubes. In particular, FIG. 3 showed that $ReS_2$ covered the closed end of the carbon tube.

The interlayer distance was approximately 0.62 nm typical of the distance between layers of $ReS_2$. Energy-dispersive X-Ray Analysis (EDX) of selected areas of the sample revealed the presence of only rhenium, sulphur and carbon. Chemical analysis, X-Ray Powder Diffraction and Raman Spectroscopy verified the formulation of the sample as $ReS_2$. The $ReS_2$ tubes had typical inner and outer diameters of 25 and 40 nm, respectively. The number of $ReS_2$ layers was 811.

EXAMPLE 2

Figure 4:
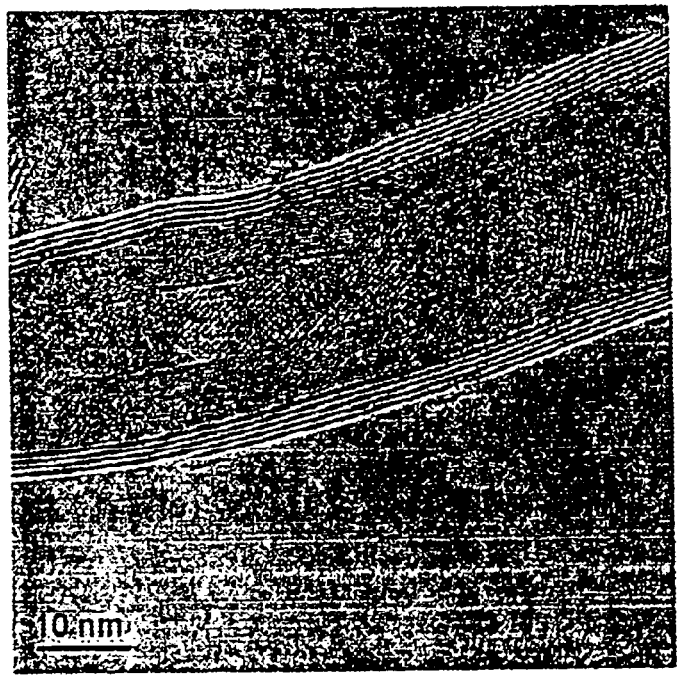
FIG. 4 shows a multi-walled carbon nanotube covered by 4–7 layers of rhenium (IV) sulphide.

A sample of $ReS_2$ on MWCNT was prepared as described in Example 1, but with the difference that the molar amount of Re in the $NH_4ReO_4$ impregnating solution was halved corresponding to a Re:C atomic ratio of 0.125 in the sample. The $ReS_2$ nanotube material obtained had the same characteristica as the material obtained in Example 1 with the exception that the typical number of $ReS_2$ layers on the MWCNT was 4–7. A HRTEM image of this sample is shown in FIG. 4.

EXAMPLE 3

Figure 5:
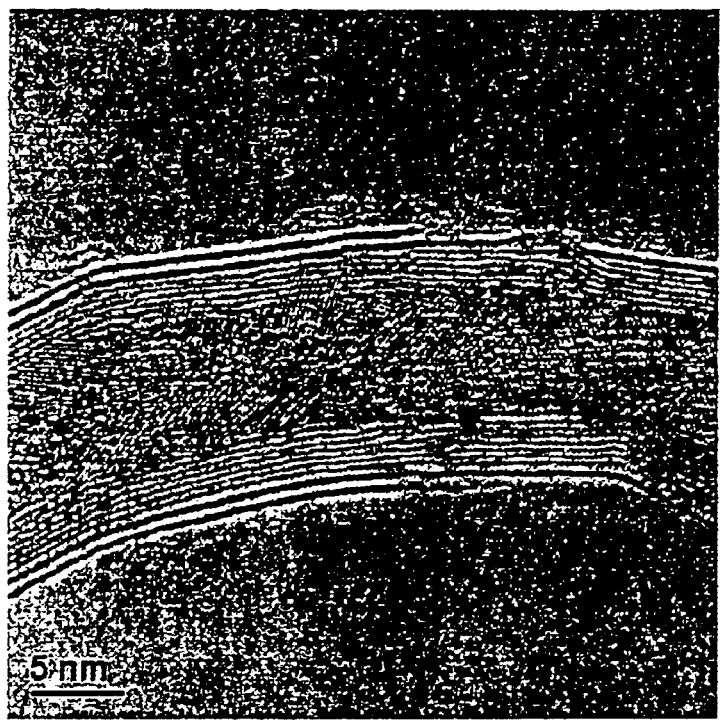
FIG. 5 shows a multi-walled carbon nanotube covered by 1–2 layers of rhenium (IV) sulphide.

A sample of $ReS_2$ on MWCNT was prepared as described in Example 1, but with the difference that the molar amount of Re in the $NH_4ReO_4$ impregnating solution is reduced to one tenth of the amount of Example 1 corresponding to a Re:C atomic ratio of 0.025 in the sample. The $ReS_2$ nanotube material obtained had the same characteristics as the material obtained in Example 1 with the exception that the typical number of $ReS_2$ layers on the MWCNT was 1–2. A HRTEM image of this sample is shown in FIG. 5.

What is claimed is:

1. Rhenium (IV) sulphide ($ReS_2$) nanotube material comprising hollow cylinders of concentric rhenium (IV) sulphide layers, the $ReS_2$ interlayer distance between 0.5 to 0.7 nm, each $ReS_2$ layer consisting of a layer of rhenium atoms sandwiched between two layers of sulphur atoms.

2. Rhenium (IV) sulphide nanotube material of claim 1, wherein the inner diameter of the nanotube is between 2 to 500 nm.

3. Rhenium (IV) sulphide nanotube material of claim 1 containing 1–50 concentric layers.

4. Rhenium (IV) sulphide nanotube material of claim 1 comprising a nanotube template material.

5. Method for the preparation of rhenium (IV) sulphide nanotube material comprising hollow cylinders of concentric rhenium (IV) sulphide layers, the method comprising the steps of:
  (a) providing a nanotube template material;
  (b) impregnating the template material with a rhenium-containing solution;
  (c) drying the impregnated template material; and
  (d) treating the dried material from step (c) with a sulphiding agent.

6. Method of claim 5 wherein the nanotube template material comprises carbon.

7. Method of claim 6 wherein the carbon nanotube template material is single-walled or multi-walled.

8. Method of claim 5 wherein the nanotube template material has an inner or outer diameter between 2 to 500 nm.

* * * * *